Patented Oct. 12, 1926.

1,602,489

UNITED STATES PATENT OFFICE.

FERDINAND HOCHSTETTER AND GUSTAF SCHMEIDEL, OF VIENNA, AUSTRIA.

METHOD OR PROCESS OF PERMANENTLY PRESERVING ANIMALS AND PLANTS.

No Drawing. Application filed December 17, 1925, Serial No. 76,093, and in Austria November 19, 1924.

This invention relates to a method or process of permanently preserving in the natural state and colour any species of animals or parts thereof or plants or parts of the same.

By the process according to the present invention even the softest and most delicate organisms and their parts can be preserved in dry manner in the natural form without any apparent shrinking and at the same time are imparted with a great capacity of resistance against any mechanical and chemical influences.

By the known processes or methods of preservation, the preservation of the shape of the object is more or less deficient, as the same mainly depends on the skill of the workman. But also the durability of the preparations prepared according to the known processes is not unlimited.

For instance a process for mummifying animals and for producing anatomical preparations is already known, according to which the body, to be treated, is at first hardened with sublimate, thereafter rectified with alcohol, soaked with volatile carburetted hydrogen and subsequently soaked with a warm mixture of paraffin and resin. Besides the fact, that by this known method the textures are mummified and not preserved without shrinking like in the process according to the present invention and that this known process is suited for preserving small animals only, a further annoying deficiency of this known process consists in that finely distributed black precipitations of metallic mercury are formed in the textures, which not only generally alter the appearance of the preparations, but also prevent the histologic examination after the lapse of some time. According to the present invention particular effects are produced in that the textures are not mummified and are not altered and retain their histologic colours, so that such preparations can be examined histologically after any desired length of time.

It is also known to employ formaldehyde for preserving anatomical preparations and the like, but only in combination with the other measures of the present process and also not for the object of producing dry preparations of whole articles.

The present process is particularly well adapted to produce preparations in the natural state, which in view of their advantages will supplant most of the preparations, enclosed in alcohol or spirit, or a large number of stuffed or similar preparations and many other preparations.

According to the present invention the preparations are preserved in the following manner:—

Preferably immediately after the death of an animal, which is to be preserved, or a living plant is placed into that position which is to be taken up permanently, and the same is retained in that position until the texture is fixed.

This fixing is accomplished in the case of plants and parts of plants as well as small animals, whose skin is sufficiently permeable for such fixing liquids, in that the same are placed into a suitable fixing liquid, or in the case of large animals and parts of animals into which the fixing liquid cannot penetrate owing to the skin, the said liquid is injected through a blood vessel or, if the body is not to be damaged, by means of the "Pravaz" syringe, whereby of course particular care has to be taken, that the shape of the body is not altered or deformed owing to the injection. After the injection has been carried out the article, to be prepared, is placed into the fixing liquid and remains in the same until all organic parts are thoroughly fixed, this requiring different periods of time and depends on the size of the article (either a few hours or days).

The following mixtures are very well suited as fixing liquid:—1 part glacial acetic acid, 6 parts alcohol of 100%, 3 parts chloroform, and if desired also 1 part of formaldehyde, or 2 parts alcohol of 96%, and 1 part formaline of 40% but also other fixing mixtures may be employed.

Particularly the mixture first mentioned has the advantage that the process can be carried out in a comparatively short space of time and that the colours are maintained in their natural state.

If the articles, to be prepared, are well fixed, the water is removed therefrom in any convenient manner. Alcohol of high percentage is well adapted for this object. If the water, contained in the preparation, is displaced by the alcohol, so that not more than 1% of water is contained therein, three per cent of the volume of a concentrated and anhydrous phenol, for example carbolic acid or creosote is added.

After some time the article is removed from the latter and placed into a solvent for solid or alphatic carburetted hydrogen such as paraffins, for instance benzene or a similar liquid, to which are also added 3 per cent of the volume of anhydrous carbolic acid or creosote.

After the article has remained for some time in this solution, the article is placed, as above, into the same but pure paraffin solvent, and this is continued until the solvent employed for the removal of the water is completely displaced in the preparation by the paraffin solvent.

Now the article is sufficiently treated to place it from the paraffin solvent directly into paraffin of a melting point of 45° Celsius which has been placed into liquid-condition by heating and is maintained in that state in a thermostat at a temperature of 45° to 48° Celsius. Thereby the paraffin in the liquid condition replaces at least partly the paraffin-solvent contained in the texture of the article. Now the paraffin is changed once or twice. Thereby practically nothing of the paraffin-solvent remains in the textures of the article and the same is completely replaced by the paraffin in the liquid condition.

Now the paraffin is removed from the article but remains on a blotting-paper in the thermostat for some time until the paraffin in excess has run off.

After this has been accomplished, the article is removed from the thermostat and is allowed to cool off at the ordinary temperature. Thereby the paraffin, which has completely soaked the article, becomes stiff and thus also the latter gets hard.

Finally, if desired, an article prepared in this manner may be provided with a coating of varnish, in order to protect the same against dust.

We claim—

1. A method of permanently preserving animals and plants, consisting in fixing the textures of the article to be preserved, subsequently rectifying the same with alcohol, soaking the same with a solvent for solid carburetted hydrogen, now displacing this solvent by carburetted hydrogen in a molten condition, and finally allowing the latter to become stiff.

2. A method of permanently preserving animals and plants, consisting in fixing the textures of the article to be preserved by the treatment with a solution consisting of glacial acetic acid alcohol of 100% and chloroform, subsequently rectifying the same with alcohol, soaking the same with a solvent for solid carburetted hydrogen, now displacing this solvent by carburetted hydrogen in a molten condition, and finally allowing the latter to become stiff.

3. A method of permanently preserving animals and plants, consisting in fixing the textures of the article to be preserved by the treatment with a solution consisting of glacial acetic acid, alcohol of 100%, chloroform and formaldehyde, subsequently rectifying the same with alcohol, soaking the same with a solvent for solid carburetted hydrogen, now displacing this solvent by carburetted hydrogen in a molten condition, and finally allowing the latter to become stiff.

4. A method of permanently preserving animals and plants, consisting in fixing the textures of the article to be preserved, subsequently rectifying the same with alcohol, containing phenol, soaking the same with a solvent for solid carburetted hydrogen, now displacing this solution by carburetted hydrogen in a molten condition, and finally allowing the latter to become stiff.

5. A method of permanently preserving animals and plants, consisting in fixing the textures of the article to be preserved, subsequently rectifying the same with alcohol, soaking the same with a solvent for solid carburetted hydrogen, containing phenol, now displacing this solvent by carburetted hydrogen in a molten condition, and finally allowing the latter to become stiff.

6. A method of permanently preserving animals and plants, consisting in fixing the textures of the article to be preserved, subsequently rectifying the same with alcohol, containing phenol, soaking the same with a solvent for solid carburetted hydrogen, containing phenol, now displacing this solvent by carburetted hydrogen in a molten condition, and finally allowing the latter to become stiff.

In testimony whereof we have signed our names to this specification.

FERDINAND HOCHSTETTER.
GUSTAF SCHMEIDEL.